United States Patent [19]

Okazaki et al.

[11] Patent Number: 4,981,613

[45] Date of Patent: Jan. 1, 1991

[54] LASER LIGHT SOURCE

[75] Inventors: Masaki Okazaki; Seiiti Kubodera, both of Kanagawa, Japan

[73] Assignee: Fuji Photo Film Co., Ltd., Kanagawa, Japan

[21] Appl. No.: 116,923

[22] Filed: Nov. 4, 1987

[30] Foreign Application Priority Data

Nov. 4, 1986 [JP] Japan .................................. 61-262100
Nov. 5, 1986 [JP] Japan .................................. 61-263032

[51] Int. Cl.$^5$ ........................... F21V 9/04; G02B 6/00
[52] U.S. Cl. .................................... 252/587; 252/589; 252/582; 252/301.35; 350/1.1; 350/354; 350/96.1; 350/96.29; 350/96.3
[58] Field of Search ............... 252/582, 589, 587, 600, 252/301.35; 350/1.1, 354, 3.64, 96.1, 96.29, 96.3

[56] References Cited

U.S. PATENT DOCUMENTS 3,395,329  7/1968  Reutzepis ............................... 321/69
4,746,199  5/1988  Nicoud et al. ........................ 350/354

FOREIGN PATENT DOCUMENTS 3707835  9/1987  Fed. Rep. of Germany .
187828  of 1987  Japan .
210431  of 1987  Japan .

OTHER PUBLICATIONS

March, J. Advance Organic Chemistry, 3rd Ed. Wiley, N.Y., 1985, pp. 242–244.
Tweig, R. J. Report 1985 UCRL-15706 Organic Materials for Second Harmonic Generation, 1986.
Chemical Abstract 106:12961V, 1987.
Williams, D. J. Angew, Chem. Int. Ed. Engl. 23 (1984) 690–703.
Davydou, L. D. et al., Optics and Spectroscopy, vol. 30(3) 274, 1971.

*Primary Examiner*—John S. Maples
*Assistant Examiner*—Richard Treanor

*Attorney, Agent, or Firm*—Sughrue, Mion, Zinn, Macpeak & Seas

[57] ABSTRACT

A light source composed of a semiconductor laser and a nonlinear optical element which converts a laser beam emitted from the semiconductor laser to a laser beam having a shorter wavelength, disposed in the path of a laser beam produced by the laser, the nonlinear optical element containing a compound represented by formula (I):

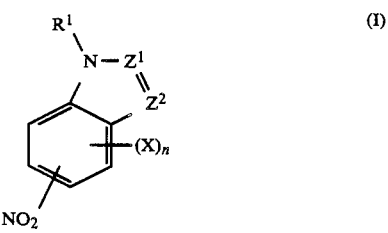

wherein $Z^1$, $Z^2$, X and n are as defined in the specification, of formula (II)

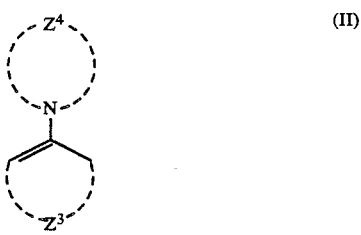

wherein $Z^3$ and $Z^4$ are defined in the specification, or an acid adduct therefore. the nonlinear optical element exhibits high transmittances to blue light and generates a laser beam having a shorter wavelength than that of the laser applied.

7 Claims, No Drawings

LASER LIGHT SOURCE

FIELD OF THE INVENTION

This invention relates to a light source using a laser, and more particularly to a small light source using a laser beam of a short wavelength.

BACKGROUND OF THE INVENTION

Laser light is utilized as a heat source, a light source, and the like, and also generally used as a light source for image recording.

Recording systems using a laser as a light source include a scanner system image formation method in which an original is scanned and a light-sensitive material is exposed to light according to the resulting image signals, and a recording system in which information is recorded on an optical recording medium called a photo disc.

Semiconductor lasers oscillating infrared light have been applied to these recording systems to reduce the size of equipment. However, use of infrared light has limited the stability or recording density of light-sensitive materials. In order to solve this problem, a semiconductor laser is desired which oscillates in a wavelength region shorter than the visible region, but this has been difficult to realize. On the other hand, much attention has recently been directed to materials having nonlinear optical effects, which, when irradiated with a strong laser beam, provide transmitted light having different components from incident light through the mutual interaction therebetween. Such materials are generally known as nonlinear optical materials and are described in detail, e.g., in David J. Williams (ed.), *Nonlinear Optical Properties of Organic and Polymeric Materials*, ACS Synposium Series 233, American Chemical Society (1983), M. Kato & H. Nakanishi (eds.), *Organic Non-linear Optical Materials*, CMC Co. (1985), D. S. Chemla & J. Zyss (eds.), *Nonlinear Optical Properties of Organic Molecules and Crystals*, Vols. 1 and 2, Academic Press, 1987, etc. It has been proposed, instead, to combine a semiconductor laser oscillating infrared light with a wavelength converter element composed of a nonlinear optical material to thereby obtain a laser beam in the visible region. However, nonlinear optical elements containing inorganic compounds, e.g., $LiNbO_3$, $KH_2PO_4$, $LiIO_3$, $BaB_2O_4$, etc., exhibit low efficiency in wavelength conversion. On the other hand, conventional organic compounds with high efficiency, such as 2-methyl-4-nitroaniline (MNA), 2-N,N-dimethylamino-5-nitroacetanilide (DAN), m-nitroaniline (m-NA), L-N-(4-nitrophenyl)-2-(hydroxymethyl)pyrrolidone, etc., have low transmittances of blue light due to their strong yellow color, failing to convert incident light to sufficiently shorter wavelength light.

SUMMARY OF THE INVENTION

Accordingly, one object of this invention is to provide a light source generating a laser beam of a short wavelength.

Another object of the invention is to provide a light source which is composed of the combination of a semiconductor laser and a wavelength converter element utilizing an organic nonlinear optical material having a high transmittance to blue light.

It has now been found that these and other objects of this invention can be accomplished by a light source composed of a semiconductor laser and a nonlinear optical element disposed in the path of a laser beam produced by the laser capable of converting a laser beam emitted from the semiconductor laser to a laser beam of shorter wavelength, the nonlinear optical element containing a compound represented by formula (I) or (II) shown below, or an acid adduct thereof:

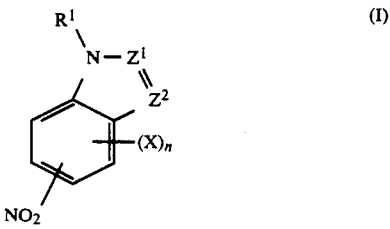

wherein $Z_1$ and $Z_2$, which may be the same or different, each represents a nitrogen atom or $CR^2$, wherein $R^2$ represents a hydrogen atom, a substituted or unsubstituted alkyl group, or a substituted or unsubstituted aryl group; X represents a substituted or unsubstituted alkyl group, a substituted or unsubstituted aryl group, a halogen atom, a substituted or unsubstituted alkoxy group, a substituted or unsubstituted aryloxy group, a substituted or unsubstituted acylamino group, a substituted or unsubstituted carbamoyl group, a substituted or unsubstituted sulfamoyl group, a substituted or unsubstituted acyloxy group, a substituted or unsubstituted alkyloxycarbonyl group, a substituted or unsubstituted aryloxycarbonyl group, a substituted or unsubstituted alkyloxysulfonyl group, a substituted or unsubstituted alkylthio group, a substituted or unsubstituted arylthio group, a hydroxyl group, a thiol group, a carboxyl group, a substituted or unsubstituted ureido group, a cyano group, a substituted or unsubstituted alkylsulfonyl group, a substituted or unsubstituted arylsulfonyl group, a substituted or unsubstituted alkylsulfinyl group, a substituted or unsubstituted arylsulfinyl group, or a nitro group; m represents 0 or an integer of from 1 to 3; and $R^1$ represents a hydrogen atom, a substituted or unsubstituted alkyl group, a substituted or unsubstituted ary group, or a substituted or unsubstituted acyl group; and

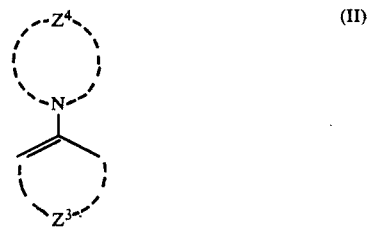

wherein $Z^3$ represents an atomic group necessary for forming a 5-membered or 6-membered aromatic ring substituted with at least one nitro group; and $Z^4$ represents an atomic group necessary for forming a substituted or unsubstituted ring selected from a pyrrole ring, an imidazole ring, a pyrazole ring, a triazole ring and a tetrazole ring.

DETAILED DESCRIPTION OF THE INVENTION

The alkyl group represented by X, $R^1$, or $R^2$ includes a methyl group, an ethyl group, an isopropyl group, a butyl group, a t-butyl group, an octyl group, a t-octyl group, a decyl group, a hexadecyl group, a dodecyl group, a docosyl group, a 2-hydroxyethyl group, a carboxymethyl group, a cyanomethyl group, a 2-methoxyethyl group, a benzyl group, a 2-phenylethyl group, a trifluoromethyl group, a 3-(2-benzimidazolyl)-propyl group, etc. The aryl group represented by X, $R^1$, or $R^2$ includes a phenyl group, a 4-methylphenyl group, a 3-methoxyphenyl group, a 4-chlorophenyl group, etc. The halogen atom represented by X includes a fluorine atom, a chlorine atom, a bromine atom, and an iodine atom. The alkoxy group includes a methoxy group, a butoxy group, a 2-methoxyethoxy group, a benzyloxy group, a 2-phenylethoxy group, etc. The aryloxy group includes a phenoxy group, a 4-t-butylphenoxy group, a 4-chlorophenoxy group, etc. The acylamino group includes an acetylamino group, a methanesulfonylamino group, a benzoylamino group, a 4-methylbenzenesulfonylamino group, etc. The carbamoyl group includes a carbamoyl group, an N-methylcarbamoyl group, an N-ethylcarbamoyl group, an N-phenylcarbamoyl group, etc. The sulfamoyl group includes a sulfamoyl group, an N-methylsulfamoyl group, an N-phenylsulfamoyl group, etc. The acyloxy group includes an acetyloxy group, a pivaloyloxy group, a benzoyloxy group, a benzenesulfonyloxy group, etc. The ureido group includes a methylureido group, an ethylureido group, a phenylureido group, etc. The alkoxycarbonyl group includes a methoxycarbonyl group, an ethoxycarbonyl group, a benzyloxycarbonyl group, etc. The aryloxycarbonyl group includes a phenoxycarbonyl group, a 4-methylphenoxycarbonyl group, a 3-chlorophenoxycarbonyl group, etc. The alkoxysulfonyl group includes a methoxysulfonyl group, an ethoxysulfonyl group, a propyloxysulfonyl group, etc. The aryloxysulfonyl group includes a phenoxysulfonyl group, a 4-methylphenoxysulfonyl group, etc. The alkylthio group includes a methylthio group, an ethylthio group, a butylthio group, etc. The arylthio group includes a phenylthio group, a 4-methylphenylthio group, etc. The alkylsulfonyl group includes a phenylsulfonyl group, a 4-chlorosulfonyl group, etc. The alkylsulfinyl group includes a methylsulfinyl group, an ethylsulfinyl group, etc. The arylsulfinyl group includes a phenylsulfinyl group, etc.

In formula (I), $R^1$, $R^2$ and X each contains 1 to 22 carbon atoms, preferably 1 to 5 carbon atoms, and more preferably 1 to 2 carbon atoms.

A preferred substituent for $R^1$ includes a hydrogen atom; a preferred substituent for $R^2$ includes an alkyl group, more preferably a methyl group; and a preferred substituent for X includes an acylamino group, more preferably an acetylamino group, and a halogen atom, more preferably a chlorine atom.

Of the compounds represented by formula (I), preferred compounds are represented by formula (III), and acid adducts thereof:

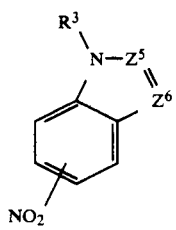

(III)

wherein $Z^5$ and $Z^6$, which may be the same or different, each has the same meaning as $Z^1$ and $Z^2$ in formula (I); and $R^3$ has the same meaning in $R^1$ in formula (I).

More preferred compounds represented by formula (I) are compounds represented by formula (IV):

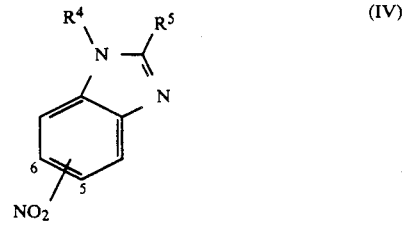

(IV)

wherein $R^4$ has the same meaning as $R^1$; $R^5$ has the same meaning as $R^2$; and the nitro group ($NO_2$) is bonded at the 5- or 6-position, or formula (V), or acid adducts thereof.

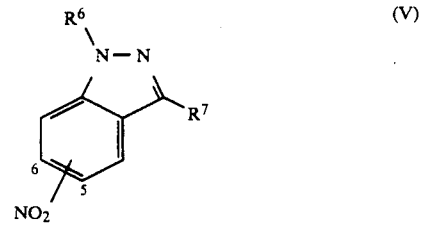

(V)

wherein $R^6$ has the same meaning as $R^1$; $R^7$ has the same meaning as $R^2$; and the nitro group ($NO_2$) is bonded at the 5- or 6-position.

In formula (II), the 5-membered or 6-membered aromatic ring formed by $Z^3$ contains at least one hetero atom selected from N, O, S, P, Se and Te, and includes a thiazole ring, an oxazole ring, an imidazole ring, a pyridine ring, a pyrimidine ring, and a benzene ring. These rings may be condensed rings with a benzene ring or a naphthalene ring.

Substituents for the aromatic rings formed by $Z^3$ or $Z^4$ include a substituted or unsubstituted alkyl group, a substituted or unsubstituted aryl group, a halogen atom, a substituted or unsubstituted alkoxy group, a substituted or unsubstituted aryloxy group, a substituted or unsubstituted acylamino group, a substituted or unsubstituted carbamoyl group, a substituted or unsubstituted sulfamoyl group, a substituted or unsubstituted acyloxy group, a substituted or unsubstituted alkyloxycarbonyl group, a substituted or unsubstituted aryloxycarbonyl group, a substituted or unsubstituted alkyloxysulfonyl group, a substituted or unsubstituted aryloxysulfonyl group, a substituted or unsubstituted alkylthio group, a substituted or unsubstituted arylthio group, a hydroxyl group, a thiol group, a carboxyl group, a substituted or unsubstituted ureido group, a cyano group, a substituted or unsubstituted alkylsulfonyl group, a substituted or unsubstituted arylsulfonyl group, a substituted or unsubstituted alkylsulfinyl group, or a substituted or unsubstituted arylsulfinyl group, a nitro group, etc. These substituents contain 1 to 22 carbon atoms, preferably 1 to 5 carbon atoms and more preferably 1 to 2 carbon atoms.

Specific examples of the alkyl group, aryl group, halogen atom, alkoxy group, aryloxy group, acylamino group, carbamoyl group, sulfamoyl group, acyloxy group, and ureido group are the same as those represented by X of formula (I).

The pyrrole ring formed by $Z^4$ includes pyrrole, indole, 2-methylindole, 5-methoxyindole, 5-hydroxyindole, L-tryptophanexarbazole, 3-carboxyindole, and 2,5-dimethylpyrrole, etc. The imidazole ring includes imidazole, 2-methylimidazole, 2-ethylimidazole, 2-undecylimidazole, 2-phenylimidazole, 2,4-dimethylimidazole, 2-ethyl-4-methylimidazole, L-histidine, 4,5-diphenylimidazole, 2,4,5-triphenylimidazole, benzimidazole, 2-methylbenzimidazole, 2-methyl-5-chlorobenzimidazole, 2-methyl-5,6-dichlorobenzimidazole, 2-methyl-5-chloro-6-cyanobenzimidazole, 2-mercaptobenzimidazole, etc. The pyrazole ring includes pyrazole, 3,5-dimethylpyrazole, 3,5-diphenylpyrazole, 4-bromo-3,5-dimethylpyrazole, 3-methylpyrazole, indazole, etc. The triazole ring includes 1,3,4-triazole, 1,2,4-triazole, 2-chloro-1,3,4-triazole, 2,5-dimethyl-1,3,4-triazole, 3,5-diphenyl-1,2,4-triazole, benzotriazole, etc. The tetrazole ring includes tetrazole, 5-phenyltetrazole, etc.

The ring represented by $Z^4$ may have a divalent substituent which forms a dimer of the compound of formula (II), e.g., —S—.

Preferred compounds represented by formula (II) are those represented by formula (VI)

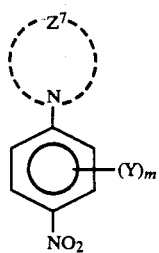

(VI)

wherein $Z^7$, Y and m have the same definition as $Z^4$, X and n, respectively, in formula (I) or (II). Most preferred compounds represented by formula (II) are those represented by formula (VII)

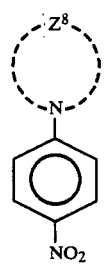

(VII)

wherein $Z^8$ has the same definition as $Z^4$ in formula (II), and preferably represents an atomic group necessary for forming a substituted or unsubstituted ring selected from a pyrrole ring, an imidazole ring, a pyrazole ring and a triazole ring, and more preferably a pyrrole ring, an imidazole ring, a pyrazole ring and a 1,2,4-triazole ring. Preferred examples of substituents on the ring formed by $Z^8$ include a hydrogen atom, a halogen atom, or an alkyl group, with a hydrogen atom, a chlorine atom, a methyl group or an ethyl group being particularly preferred.

The terminology "acid adduct" as used herein means an adduct of the compound represented by formulae (I) to (IV) with, usually, one molecule of an organic acid, e.g., a carboxylic acid, a sulfonic acid, etc., or an inorganic acid, e.g., sulfuric acid, hydrochloric acid, ntiric acid, phosphoric acid, etc. Preferred organic acids include a sulfonic acid, in particular, p-toluenesulfonic acid, and preferred inorganic acids include hydrochloric acid.

Specific examples of the compounds represented by formula (I) (Compounds Nos. 1 to 24) and the compounds represented by by formula (II) (Compounds Nos. 25 tp 53) are given below, but the present invention is not to be construed as being limited thereto:

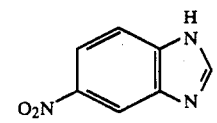

1

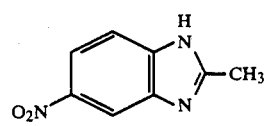

2

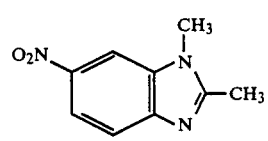

3

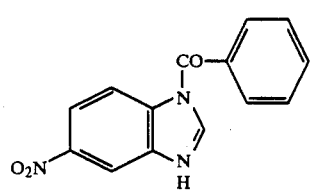

4

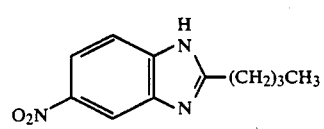

5

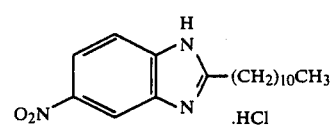

6

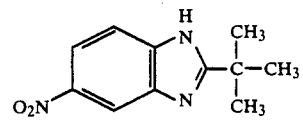

7

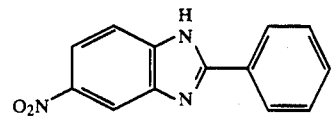

8

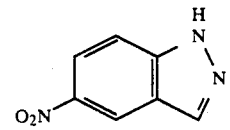

9

-continued
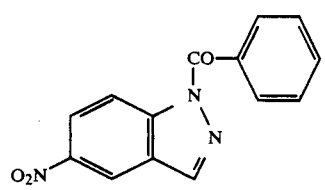  10
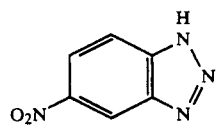  11
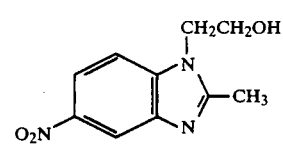  12
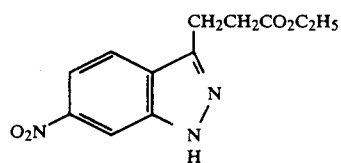  13
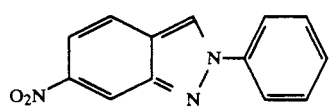  14
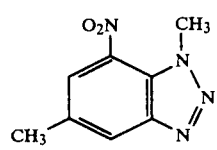  15
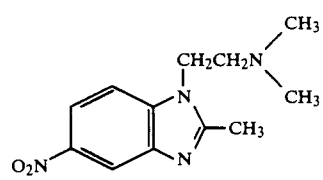  16
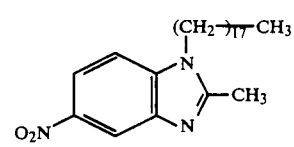  17
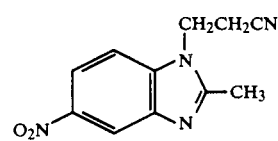  18
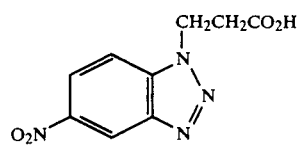  19
-continued
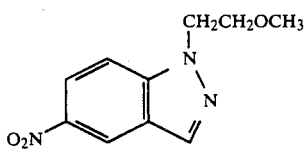  20
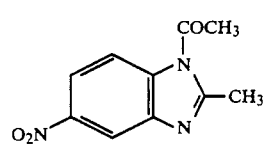  21
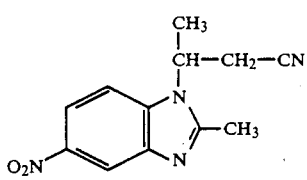  22
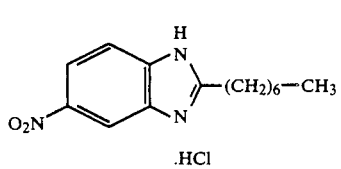  23
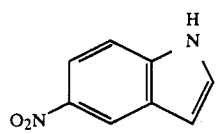  24
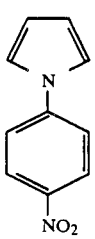  25
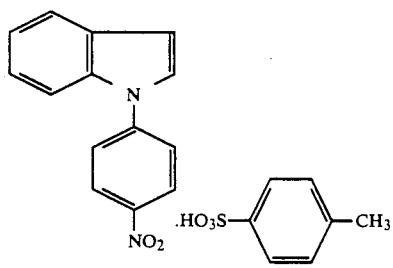  26
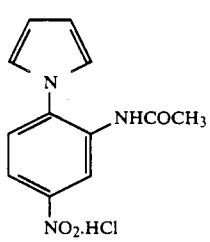  27

-continued
28
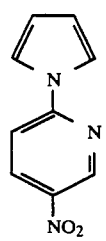
29
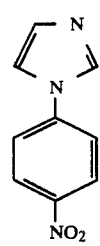
30
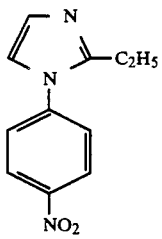
31
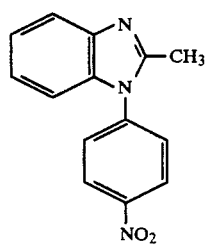
32
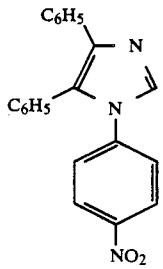
33
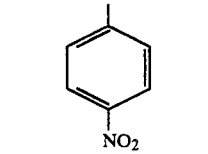
-continued
34
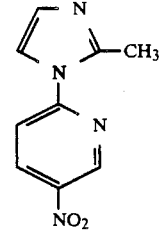
35
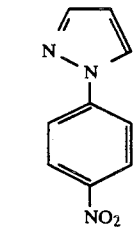
36
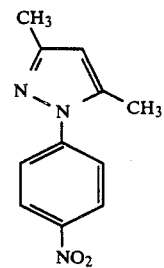
37
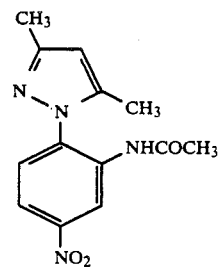
38
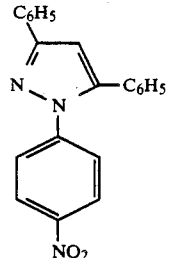
39
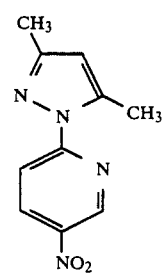

-continued
| | |
|---|---|
| 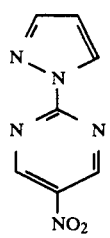 40 | 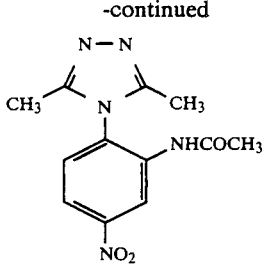 46 |
| 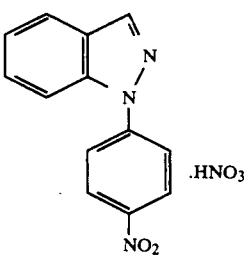 41 | 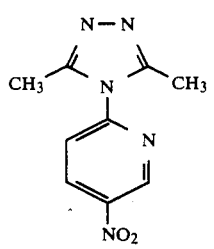 47 |
| 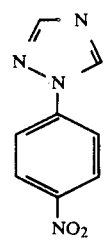 42 | 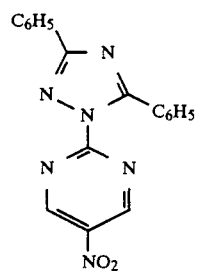 48 |
| 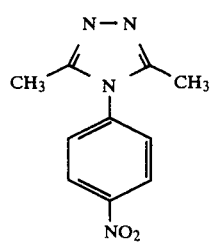 43 | 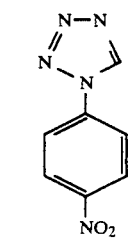 49 |
| 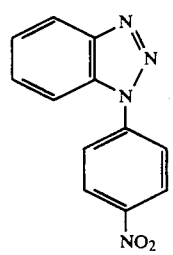 44 | 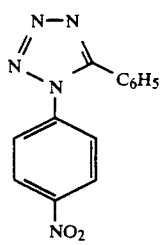 50 |
| 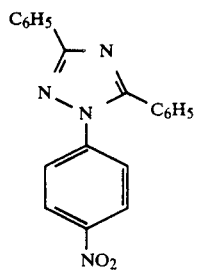 45 | 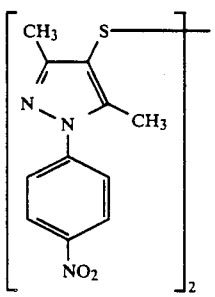 51 |

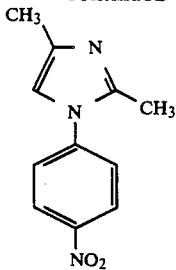

52

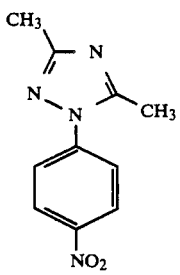

53

Most of the compounds of formula (I) are known and can be synthesized, for example, by the process described in Elderfield, *Heterocyclic Compounds*, Vol. 5, pp. 162–297 (1957) and Vol. 7, pp. 384–461 (1961) (John Wiley & Sons, New York). They are also available as commercial reagents, such as those sold by Wako Pure Chemicals, Tokyo Chemical Industry, Co., Ltd., and Aldrich.

Specific examples of a suitable process for synthesizing Compound Nos. 2 and 5 [i.e., compounds of formula (I)] are described in Japanese Patent Application (OPI) No. 210430/87 (the term "OPI" as used herein means an unexamined published Japanese patent application). The superiority of the compounds of formula (I) in transmission of blue light is described in Example 4 of the above Japanese patent application.

The compounds represented by formula (II) can be synthesized, for example, by the process described in Elderfield, *Heterocyclic Compounds*, Vol. 1, pp. 277–342 (1950), Vol. 3, pp. 1–274 (1952), Vol. 5, pp. 45–297 (1957) and Vol. 7, pp. 384–461 (1961) (John Wiley & Sons, New York). More specifically, these compounds can be synthesized easily according to, for example, the following reaction scheme:

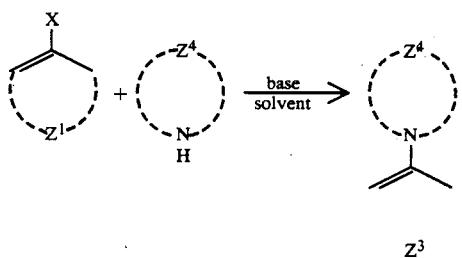

wherein $Z^1$, $Z^3$, and $Z^4$ are defined above; and X represents a halogen atom.

The base which can be used in the above reaction includes organic bases, e.g., pyridine, triethylamine, 1,8-diazabicyclo[5,4,0]-7-undecene, etc., and inorganic bases, e.g., potassium carbonate, sodium hydrogen carbonate, potassium t-butoxide, sodium hydride, sodium hydroxide, etc. The solvent to be used includes hydrocarbons, e.g., n-hexane, etc.; ethers, e.g., tetrahydrofuran, 1,2-dimethoxyethane, etc.; amides, e.g., N,N-dimethylformamide, N-methylpyrrolidone, etc.; sulfur-containing compounds, e.g., sulforan, etc.; nitriles, e.g., acetonitrile, etc.; esters, e.g., ethyl acetate, etc.; and the like. Of these, amides, sulfur-containing compounds, and nitriles are preferred.

The above reaction can be carried out at a temperature preferably ranging from about −10° C. to about 150° C., and more preferably from about 20° C. to 100° C., for a period of from about 30 minutes to about 10 hours, preferably from 2 to 5 hours, under atmospheric pressure, preferably while vigorous stirring.

Specific examples of the process for synthesizing Compound Nos. 1, 6 and 29 represented by formula (II) are described in Japanese Patent Application (OPI) No. 210432/87. The superiority of the compounds of formula (II) in transmission of blue light is demonstrated in Example 2 of the above Japanese patent application.

The terminology "nonlinear optical material" as used herein means a material which there is a nonlinearity relationship between polarization and an electric field, i.e., nonlinear optical effects, when exposed to a strong photoelectric field, such as laser light. The nonlinear optical effects produce second-order nonlinear effects, such as second harmonic generation, optical mixing, parametric oscillation, optical rectification, Pockels effect, etc.; third-order effects, such as third harmonic generation, Kerr effect, optical bistability, optical mixing, etc.; and also effects of higher order, as described in Amnon Yariv, *Introduction to Optical Electronics*, Chapter 8, Holt Rinehart and Winston, Inc. (1971). In the present invention, use of the nonlinear optical material permits the conversion of light having wavelengths in the infrared region emitted from semiconductor lasers to light having wavelengths in the visible region. Therefore, important nonlinear effects are those contributing to wavelength conversion, i.e., second harmonic generation, optical mixing, parametric oscillation, and third harmonic generation.

Known forms of nonlinear optical elements (or wavelength converter elements) using a semiconductor laser and a nonlinear optical material include a single crystal waveguide optical element, a single crystal optical element, an organic crystal cored fiber optical element, and the like. Examples of the waveguide element include a plain waveguide, element as described in Japanese Patent Application (OPI) Nos. 142284/76, 108779/77, and 125286/77; a buried waveguide element as described in Japanese Patent Application (OPI) Nos. 14222/86, 57825/85, and 112023/85; and a tapered waveguide element as described in Japanese Patent Application (OPI) No. 250334/85. Examples of the fiber element include those described in Japanese Patent Application (OPI) No. 211125/82, in which phase-matching conditions for an incident laser wave and a converted laser wave are satisfied.

The semiconductor laser which can be used in combination with the nonlinear optical element according to the present invention is known in the art, as described in, for example, H. C. Casey, Jr. et al, *Heterostructure Lasers*, Academic Press, 1978 and Henry Kressel et al, *Semiconductor Lasers and Heterojunction LEDs*, Academic Press, 1977.

The nonlinear optical elements according to the present invention are produced in any of the above-described forms by the use of the compounds of formula (I) or (II) or acid adducts thereof.

The light source of the present invention are applicable to various purposes, such as for photoresists, reading of photo discs, laser beam measurement and testing, and medical use. When it is applied to optical recording systems, the recording materials to be used include electrophotographic photoreceptors, electrophotographic light-sensitive materials silver halide photographic materials, photo discs, printing plates or recording materials using photopolymers, and so on.

Using the nonlinear optical element comprising the compound of formula (I) or (II) or an acid adduct thereof in combination with a semiconductor laser, the present invention has now made it possible to produce a laser beam having a wavelength in the visible region.

In a preferred embodiment of the present invention, the semiconductor laser is capable of emitting a laser beam having a wavelength of 0.78 to 1.3 μm and the light source is capable of converting the beam into a laser beam having a wavelength of 0.39 to 0.65 μm.

The present invention will now be illustrated in greater detail by reference to the following examples, but the present invention is not to be construed as being limited thereto. Unless otherwise indicated, all parts, percents and ratios are by weight.

EXAMPLE 1

Single crystals of Compound No. 10 (1 mm$^3$ cubic where prepared by solvent evaporation using acetone as a solvent.

A semiconductor laser oscillating infrared light having a wavelength of 1.3 μm was used as an infrared light source.

When the infrared light emitted from the laser was condensed on the crystals of a nonlinear optical element through a Selfoc lens, a laser beam having a wavelength of 0.65 μm was generated.

EXAMPLE 2

Single crystals of Compound No. 2 were formed in a glass capillary by the Bridgman method to obtain a nonlinear optical element having a core diameter of 2 μm and a length of 10 mm.

A semiconductor laser having an oscillation wavelength of 1.05 μm was used as an infrared light source.

The infrared radiation emitted from the laser was condensed through a lens and directed into one end of the fiber. The transmitted light obtained from the other end of the fiber had a wavelength of 0.525 μm.

EXAMPLE 3

Single crystals of Compound No. 2 were formed by crystallization between two glass plates with spacers therebetween using the Bridgman method to obtain a thin film waveguide nonlinear optical element having a thickness of 2 μm, a length of 2 mm and a width of 2 mm.

A semiconductor laser having an oscillation wavelength of 0.84 μm was used as an infrared light source.

Infrared rays emitted from the laser were condensed through a lens and applied to one side of the nonlinear optical element. The transmitted light obtained from the other side had a wavelength of 0.42 μm.

EXAMPLE 4

The same nonlinear optical element as obtained in Example 2 was combined with a semiconductor laser having an oscillation wavelength of 1.3 μm, 1.05 μm, or 0.84 μm, in the same manner as in Example 2. As a result, a red, green or blue laser beam having a wavelength of 0.65 μm, 0.525 μm, or 0.42 μm was obtained, respectively.

Each of the resulting laser beams was condensed through a lens and projected on a color paper using a Galvano scanner so that the color paper was successively imagewise exposed to light corresponding to the light signals. The exposed color paper was subjected to color development processing including development, fixation, desilvering, washing, and drying, to obtain a color image corresponding to the input signals.

EXAMPLE 5

A laser beam obtianed from the light source of Example 2 was focused on an electrophotographic photoreceptor using a collimater lens and a condenser lens. The light beam was scanned on the photoreceptor using a Galvano scanner. An electrostatic latent image was thus formed on the photoreceptor corresponding to the light signals. The photoreceptor was then subjected to electrophotographic processing including development, transfer, and fixation, to obtain a hard copy on paper which corresponded to the input signals.

EXAMPLE 6

The same nonlinear optical element as obtained in Example 2 was combined with a semiconductor laser having an oscillation wavelength of 0.84 μm to provide a laser beam having a wavelength of 0.42 μm. The laser beam was collimated through a collimater lens and then passed through filter cutting light of 0.84 μm to thereby isolate a light beam having a wavelength of 0.42 μm. The monochromatic light was passed through a half prism and focused in a spot on an optical disc through a condenser lens. The reflected light from the disc was again passed through the condenser lens, reflected on the half prism, condensed through a receptor lens, applied to a photodiode through a cylindrical lens, and converted to electrical signals.

EXAMPLE 7

A photopolymerizable composition, i.e., an ethyl alcohol/methyl ethyl ketone solution containing 62 g of a copolymer of methyl methacrylate and methacrylic acid (85:15 by weight) as a binder, 38 g of trimethylolpropane triacrylate as an unsaturated compound, 2 g of 2-(p-methoxyphenyl)4,6-bis(trichloromethyl)-s-triazine as a photopolymerization initiator and 2 g of Michler's ketone as a sensitizer, per liter of the solution was coated on an aluminum sheet to form a photopolymerizable layer.

The photopolymerizable layer was exposed to light by scanning with a laser beam having a beam diameter of 50 μm using the same light source as in Example 2 while varying the quantity of light by controlling the electrical current applied to the semiconductor laser. The layer was then developed by lightly rubbing in tap water and dried to obtain a relief image.

EXAMPLE 8

Single crystals of Compound No. 30 (1 mm$^2$ cubic) obtained by solvent evaporation using acetone as a solvent were used as a nonlinear optical element.

A semiconductor laser having an oscillation wavelength of 1.05 μm was used as an infrared light source. The infrared light emitted from the laser was condensed on the nonlinear optical element through a Selfoc lens to generate a laser beam having a wavelength of 0.525 μm.

EXAMPLE 9

Single crystals of Compound No. 36 formed in a glass capillary using the Bridgeman method were used as a fiberform nonlinear optical element having a core diameter of 2 μm and a length of 10 mm.

A semiconductor laser having an oscillation wavelength of 0.84 μm was used as an infrared light source. The infrared light emitted from the laser was condensed through a lens and directed into one end of the fiber. The transmitted light obtained from the other end had a wavelength of 0.42 μm.

EXAMPLE 10

Single crystals of Compound No. 53 were grown between two glass plates with spacers therebetween using the Bridgman method to obtain a thin film waveguide nonlinear optical element having a thickness of 2 μm, a length of 2 mm and a width of 2 mm.

A semiconductor laser having an oscillation wavelength of 1.3 μm was used as an infrared light source. The infrared light emitted from the laser was condensed through a lens and applied to one side of the nonlinear optical element. The transmitted light obtained from the other side had a wavelength of 0.65 μm.

EXAMPLE 11

The same nonlinear optical element as used in Example 9 was combined with a semiconductor laser having an oscillation wavelength of 1.3 μm, 1.05 μm, or 0.84 μm in the same manner as in Example 9 to obtain a red, green, or blue laser beam having a wavelength of 0.65 μm, 0.525 μm, or 0.42 μm, respectively.

Each of the laser beams was condensed and scanned by means of a lens and Galvano scanner, and the resulting light signals were successively applied to a color paper. The exposed color paper was subjected to color development processing including development, fixation, desilvering, washing, and drying, to obtain a color image corresponding to the input signals.

EXAMPLE 12

A laser beam emitted from the same laser light source as in Example 8 was focused on an electrophotographic photoreceptor through a collimater lens and a condenser lens. The light beam was scanned on the photoreceptor using a Galvano scanner. An electrostatic latent image corresponding to the light signals was thus formed on the photoreceptor. The photoreceptor was then subjected to electrophotographic processing including development, transfer, and fixation to thereby obtain a hard copy on paper corresponding to the input signals.

EXAMPLE 13

The same nonlinear optical element as in Example 10 was combined with a semiconductor laser having an oscillation wavelength of 0.84 μm to obtain a laser beam having a wavelength of 0.42 μm.

The resulting laser beam was collimated by means of a collimater lens and then passed through a filter cutting light of 0.84 μm to isolate a light beam of 0.42 μm. The thus isolated light was passed through a half prism and focused in a spot on an optical disc through a condenser lens. The light reflected on the disc was again passed through the condenser lens, reflected on the half prism, condensed through a receptor lens, applied to a photodiode through a cyclindrical lens, and converted to electrical signals.

EXAMPLE 14

A photopolymerizable composition comprising an ethyl alcohol/methyl ethyl ketone solution containing a binder, an unsaturated compound, a photopolymerization initiator, and a sensitizer was coated on an aluminum sheet to form a photopolymerizable layer.

A light beam emitted from the same light source as in Example 9 was applied to the photopolymerizable layer at a beam diameter of 50 μm while varying the quantity of light by controlling the electrical current applied to the semiconductor laser. The exposed layer was developed by lightly rubbing in tap water, followed by drying to thereby obtain a relief image.

While the invention has been described in detail and with reference to specific embodiments thereof, it will be apparent to one skilled in the art that various changes and modifications can be made therein without departing from the spirit and scope thereof.

What is claimed is:

1. A light source comprising a semiconductor laser and a nonlinear optical element capable of converting a laser beam emitted from the semiconductor laser to a laser beam of shorter wavelength, disposed in the path of a laser beam produced by said laser, said nonlinear optical element comprising a compound represented by formula (VII), or an acid adduct formed with a carboxylic acid, a sulfonic acid, sulfuric acid, hydrochloric acid, nitric acid or phosphoric acid thereof

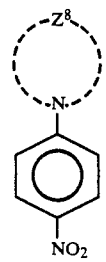

(VII)

wherenin $Z^8$ represents a pyrrole ring, an imidazole ring, a pyrazole ring, a benzimidazole ring or a triazole ring, each of which ring may be substituted with at least one of methyl group and an ethyl group.

2. The light source as claimed in claim 1, wherein said nonlinear optical element is a single crystal waveguide optical element.

3. The light source as claimed in claim 1, wherein said nonlinear optical element is a single crystal optical element.

4. The light source as claimed in claim 1, wherein said optical element is an organic crystal cored fiber optical element.

5. The light source as claimed in claim 2, wherein said optical element is a buried waveguide element.

6. The light source as claimed in claim 2, wherein said optical element is a tapered waveguide element.

7. The light source as claimed in claim 1, wherein said semiconductor laser is capable of emitting a laser beam having a wavelength of 0.78 to 1.3 μm and said light source is capable of converting said beam into a laser beam having a wavelength of 0.39 to 0.65 μm.

* * * * *